(12) United States Patent
Kim

(10) Patent No.: US 6,990,594 B2
(45) Date of Patent: Jan. 24, 2006

(54) DYNAMIC POWER MANAGEMENT OF DEVICES IN COMPUTER SYSTEM BY SELECTING CLOCK GENERATOR OUTPUT BASED ON A CURRENT STATE AND PROGRAMMABLE POLICIES

(75) Inventor: Jason Seung-Min Kim, San Jose, CA (US)

(73) Assignee: PortalPlayer, Inc., San Jose, CA (US)

( * ) Notice: Subject to any disclaimer, the term of this patent is extended or adjusted under 35 U.S.C. 154(b) by 515 days.

(21) Appl. No.: 09/847,975

(22) Filed: May 2, 2001

(65) Prior Publication Data

US 2003/0025689 A1 Feb. 6, 2003

(51) Int. Cl.
*G06F 1/06* (2006.01)

(52) U.S. Cl. ...................................... 713/322; 713/501

(58) Field of Classification Search ................ 713/300, 713/322, 324, 501
See application file for complete search history.

(56) References Cited

U.S. PATENT DOCUMENTS

| 4,868,832 | A  |   | 9/1989  | Marrington et al. .......... 371/66 |
|-----------|----|---|---------|-------------------------------------|
| 5,339,445 | A  |   | 8/1994  | Gasztonyi .................... 395/750 |
| 5,586,308 | A  | * | 12/1996 | Hawkins et al. ............. 713/501 |
| 5,737,613 | A  | * | 4/1998  | Mensch, Jr. ................. 713/322 |
| 6,134,167 | A  |   | 10/2000 | Atkinson ..................... 365/222 |
| 6,163,583 | A  | * | 12/2000 | Lin et al. ..................... 375/354 |
| 6,216,234 | B1 | * | 4/2001  | Sager et al. ................. 713/501 |
| 6,600,575 | B1 | * | 7/2003  | Kohara ........................ 358/406 |
| 6,678,831 | B1 | * | 1/2004  | Mustafa et al. ............. 713/320 |

* cited by examiner

*Primary Examiner*—Thomas Lee
*Assistant Examiner*—Albert Wang
(74) *Attorney, Agent, or Firm*—David H. Jaffer; Pillsbury Winthrop Shaw Pittman LLP

(57) ABSTRACT

A power management system and method permit the total power consumption by a portable electronic device to be reduced so that the portable electronic device has a longer operating time on a limited power source, such as a battery. The system may also be used with devices that are powered by a more permanent source of power. The system may combine static power management techniques as well as dynamic power management techniques. The system may include a flexible clock generator.

55 Claims, 4 Drawing Sheets

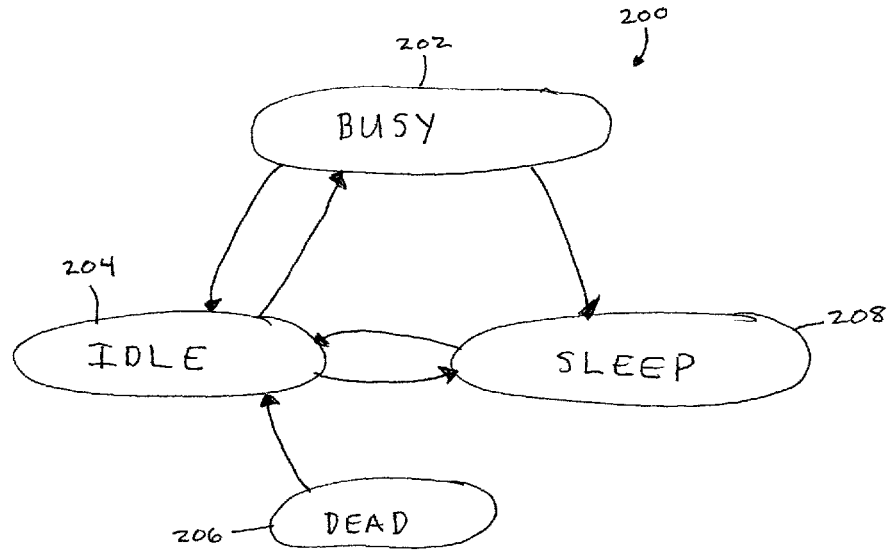

FIGURE 6

I. PP6001B POWER MANAGEMENT REGISTER DESCRIPTIONS

| bit15 | bit14 | bit13 | bit12 | bit11 | bit10 | bit9 | bit8 | bit7 | bit6 | bit5 | bit4 | bit3 | bit2 | bit1 | bit0 | |
|---|---|---|---|---|---|---|---|---|---|---|---|---|---|---|---|---|
| MSTK | MMC | SMC | CF | LCD.B | LCD.C | UART | I2C | I2S | SPDIF | AC97 | TMR | RTC | C.EXT | C.24M | C.32K | CF00:5000 |
| 24MHz | 24MHz | 24MHz | sysclk | sysclk | 24MHz | 24MHz | 24MHz | 24MHz | 24MHz | sysclk | 24MHz | 32KHz | SYSCLK | 24MHz | 32KHz | CF00:5000 |
| rsvd | rsvd | rsvd | rsvd | rsvd | rsvd | rsvd | rsvd | rsvd | rsvd | CCH1 | CCH0 | rsvd | IDE | USB | GPIO | CF00:5004 |
| rsvd | rsvd | rsvd | rsvd | rsvd | rsvd | rsvd | rsvd | rsvd | rsvd | rsvd | rsvd | rsvd | sysclk | 24/48 | sysclk | CF00:5004 |
| AUTO | rsvd | rsvd | rsvd | COP.STATE | | | | AUTO | rsvd | rsvd | rsvd | CPU.STATE | | | | CF00:5008 |
| COP.FIQ | | COP.IRQ | | COP.MAIN | | COP.IDLE | | CPU.FIQ | | CPU.IRQ | | CPU.MAIN | | CPU.IDLE | | CF00:500C |
| PLL | X24M | X32K | 0 | SYS_CLK_SOURCE | | | | BURST_CLK_RATE | | | | RUN_CLK_RATE | | | | CF00:5010 |
| rsvd | rsvd | rsvd | rsvd | rsvd | rsvd | rsvd | rsvd | rsvd | rsvd | rsvd | rsvd | rsvd | rsvd | rsvd | rsvd | CF00:5014 |
| rsvd | rsvd | rsvd | rsvd | rsvd | rsvd | rsvd | rsvd | PLL_PRESCALAR_VALUE | | | | | | | | CF00:5018 |
| rsvd | rsvd | rsvd | rsvd | rsvd | rsvd | rsvd | rsvd | PLL_POSTSCALAR_VALUE | | | | | | | | CF00:501C |
| FREE_RUNNING_PLL_COUNTER (PNG_LFSR) | | | | | | | | | | | | | | | | CF00:5020 |
| 0 | 0 | Z.SWR | Z.WDT | S.SWR | S.WDT | P.SWR | P.WDT | 0 | 0 | WDT.E | WDT.X | 0 | W.SYS | W.COP | W.CPU | CF00:502C |
| MSTK | MMC | SMC | CF | LCD.B | LCD.C | UART | I2C | I2S | SPDIF | AC97 | TMR | 0 | SYS.R | COP.R | CPU.R | CF00:5030 |
| rsvd | rsvd | rsvd | rsvd | rsvd | rsvd | rsvd | rsvd | rsvd | rsvd | CCH1 | CCH0 | rsvd | IDE | USB | GPIO | CF00:5034 |

FIGURE 7

DYNAMIC POWER MANAGEMENT OF DEVICES IN COMPUTER SYSTEM BY SELECTING CLOCK GENERATOR OUTPUT BASED ON A CURRENT STATE AND PROGRAMMABLE POLICIES

BACKGROUND OF THE INVENTION

This invention relates generally to a system and method for managing the power consumption of an electronic device and in particular to a system and method for managing the power consumption of a computer system having one or more electrical components.

With modern electrical systems, it is often desirable to be able to conserve power and reduce the power consumption of the electrical systems. For example, it is desirable to be able to reduce the power consumption of a computer system. For a desktop system that is plugged into an AC outlet, the desirability of power consumption is important. However, for a laptop computer system or any other type of portable computer system that uses battery power or some other limited power source, the desirability of power conservation is critical. In particular, the conservation of power during the operation of the computer system while it is connected to a limited capacity power supply, such as a battery, is critical. The conservation of power leads to longer battery life, which is very desirable.

In general, the power being consumed by an electrical device is equal to $P=CV^2F$ wherein P is the total power, in watts, being consumed by the electrical device, C is the capacitance of the electrical device nodes, V is a voltage being used by the electrical device, and F is the switching frequency of the signal being applied to the electrical circuit. Thus, an electrical device that operates at a high frequency uses more power than the same device at a lower frequency since the transistors and logic gates in the device at the higher frequency will switch more often. With modern electrical devices, the voltage being used by the device (which used to be 5 volts, was 3.3 volts and will soon become 1.8 volts and lower) is somewhat unchangeable since one is typically required to use whatever voltage is currently being required by the semiconductor manufacturers. Therefore, to lower the power being consumed by the electrical device, one can decrease the node capacitance of the electrical device or one can decrease the clock frequency being applied to the electrical device. The capacitance of the electrical device may be reduced by stopping the operation of one or more portions of the electrical device which reduces the overall switching node capacitance of the device.

The conservation/management of power in a portable electronic device can be achieved by various mechanisms. For example, a portable electronic device typically has one or more different discrete electrical elements/components such as a processor, one or more different memory devices, one or more different electrical buses, one or more input/output interfaces and one or more different peripheral devices which are connected to the buses. The peripheral devices may include a display, such as a liquid crystal display (LCD), a cathode ray tube (CRT) or the like, a persistent storage device, such as a hard disk drive, a removable media storage unit, optical drive, zip drive or the like, one or more input devices, such as a keyboard or mouse and one or more output devices, such as a speaker or an output port. In general, to reduce the power consumption of the portable electronic device, static power management strategies and dynamic power management strategies may be employed. Using static power management techniques, different elements of the portable electronic device may be powered down in order to reduce the power consumption of the portable electronic device by reducing the total capacitance of the portable electronic device. For example, the display of a laptop computer or the display of a portable music device may be powered down during periods when there is no user activity (e.g., the user has not touched the keyboard or mouse for some predetermined period of time). As another example, the hard disk drive of a laptop computer may spin down and stop during the same user inactivity periods. Thus, during periods of inactivity, static power management helps to reduce the power consumption of the system. Using dynamic power management techniques, even during periods of usage, the power consumption of one or more elements of the computer system may be reduced by reducing the effective clock frequency applied to the elements of the computer system for some predetermined amount of time.

The problem and limitation with conventional static and dynamic power management techniques is that one must be able to rapidly return an electrical element to its fastest clock frequency when its clock frequency has been reduced or stopped, otherwise the performance of the portable electronic device may be impaired. In some conventional systems, the clock frequency applied to one or more elements of the computer system is reduced by reducing the speed (e.g., slowing down) of the well known phase locked loop (PLL) which generates the clock signals for the portable electronic device. Then, the speed of the PLL is increased when it is necessary to increase the clock speed of the electrical element. The problem with that approach is that it takes too long to restore the clock frequency and the performance of the portable electronic device is degraded. In particular, the mechanisms used to sense the need to restore the clock frequency and the time that it takes to communicate that restoration command to the PLL is long, and the time that it takes the PLL to restore its original clock frequency is even longer, such that the total cumulative delay to restore the original clock frequency becomes prohibitively long.

It is desirable to provide a different technique that does not suffer the same problems and limitations as conventional dynamic power management systems. It is also desirable to provide a power management system that incorporates both static and dynamic power management techniques. Thus, it is desirable to provide a power consumption system and method and it is to this end that the present invention is directed.

SUMMARY OF THE INVENTION

The power management system and method in accordance with the invention overcomes the limitations and problems with typical power management systems and permits the total power being consumed by a portable electronic device to be minimized so that the battery life of the portable electronic device is maximized. The power management system in accordance with the invention combines one or more power conservation techniques to achieve the best possible power conservation. The power conservation techniques may include static power controls, dynamic power controls, asynchronous buffers and scaleable device clock domains and a flexible clock generator with a software programmable phase locked loop (PLL) that may include one or more different programmable clock policies with programmable clock rates. In a preferred embodiment, there may be four programmable clock policies with four programmable clock rate selectors.

In more detail, the static power control utilizes the means for shutting down/powering down of any unused functional modules at different times that may be accomplished by "gating-off" both logic and clock sources to all of the internal functional blocks. The different functional blocks that may be turned off may include the 24 MHz crystal (X24M) in the clock generator, the 32 kHz crystal (X32K) in the clock generator, the phase locked loop (PLL) in the clock generator, the RTC, the timer (TMR), a audio codec controller (AMC 97), the digital audio exchange interface (SPDIF), the $I^2S$ serial interface bus, the $I^2C$ systems management bus, the universal asynchronous receive/transmit unit (UART), the liquid crystal display device (LCD), the Compact Flash memory card (CF), the Smart Media Card flash memory (SMC), the Multi-Media Card flash memory (MMC), the Sony Memory Stick (MSTK), the general purpose input/output port (GPIO) and interface, the universal serial bus (USB) port interface, the AT Attachment interface (IDE), the Cache Controller (CCH), and either of the processors.

A dynamic power control utilizes the clocking mechanism to reduce power consumption. The asynchronous buffers and scaleable device clock domains for each internal module is provided in order to minimize unnecessary logic switching for each peripheral controllers. The flexible clock generator has a software programmable PLL with prescalar and postscalar to "dial in" or set the appropriate clock frequency to provide just-enough clock speed for the particular task at hand. To use the flexible clock generator, the portable electronic device may include one or more clock policies (four in the preferred embodiment) wherein the clock rate is selected according to the task at hand. The programmable clock rate selectors are provided to automate the dynamic performance boosting for long enough to complete the task using hardware triggered prioritized interrupt services. This provides automated performance scaling to maintain real-time responses and latencies while in different modes at the lowest power consumption.

An hybrid power control utilizes the usual static (spatial) power control mechanisms in a dynamic (temporal) means. Consequently, this technique allows to gate off more portion of a functional module at a much faster rate such that activation of smaller control circuitry would run along the path of data propagation. For example, when a processor wants to access a certain device on a common bus, the bus interface signals are dynamically routed to one and only one target device for each bus cycles, such that no other device on the same bus would be activated. Unlike the typical implementation of Chip Select which disables other devices from responding, this is implemented by turning-on data path to a single target device, while gating off every other data and control interface signals to every other devices on the same bus. This provides a "virtual disconnect" of the modules that are not in direct line of communication with the processor, such that no power is wasted by the non-participating devices in the high speed internal buses.

Thus, in accordance with the invention, a power management system for a computer system having one or more different components wherein power is dynamically supplied to each component is provided. The power management system comprises a clock generator circuit for generating one or more different clock signals wherein each clock signal has a different predetermined frequency and a clock selector circuit that, based on the task being performed by the computer system, dynamically adjusts the clock signal supplied to each component of the computer system in order to reduce the total power being consumed by the computer system.

In accordance with another aspect of the invention, a power management method for a computer system having one or more different components wherein power is dynamically supplied to each component is provided wherein one or more different clock signals are simultaneously generated wherein each clock signal has a different predetermined frequency and the clock signal supplied to each component of the computer system is dynamically adjusted in order to reduce the total power being consumed by the computer system.

In accordance with yet another aspect of the invention, a flexible clock generator is provided. The clock generator comprises a first oscillator that generates a first clock signal, a second clock oscillator that generates a second clock signal and a programmable clock circuit that generates a third clock signal based on the second clock signal. The clock generator further comprises a clock select circuit that selects one of the first, second and third clock signal that is supplied to a portion of the computer system to provide that portion of the computer system with a predetermined clock signal.

BRIEF DESCRIPTION OF THE DRAWINGS

FIG. 6 is a flowchart illustrating the dynamically programmable power management states in accordance with the invention; and FIG. 7 is a diagram illustrating an example of the power management registers in a preferred embodiment of the invention.

DETAILED DESCRIPTION OF A PREFERRED EMBODIMENT

The invention is particularly applicable to a portable digital music device and it is in this context that the invention will be described. It will be appreciated, however, that the power management system and method in accordance with the invention has greater utility, such as to any other electronic device that desirably needs to reduce the power consumption of the device and especially to any limited power source devices, such as battery powered devices, rechargeable battery powered devices and the like, where it is very desirable to reduce the power consumption of the device. Now, a preferred embodiment of a portable electronic device which is a portable digital music system will be described to provide context for the invention since the invention is applicable to many different electronic systems.

Figure 1:
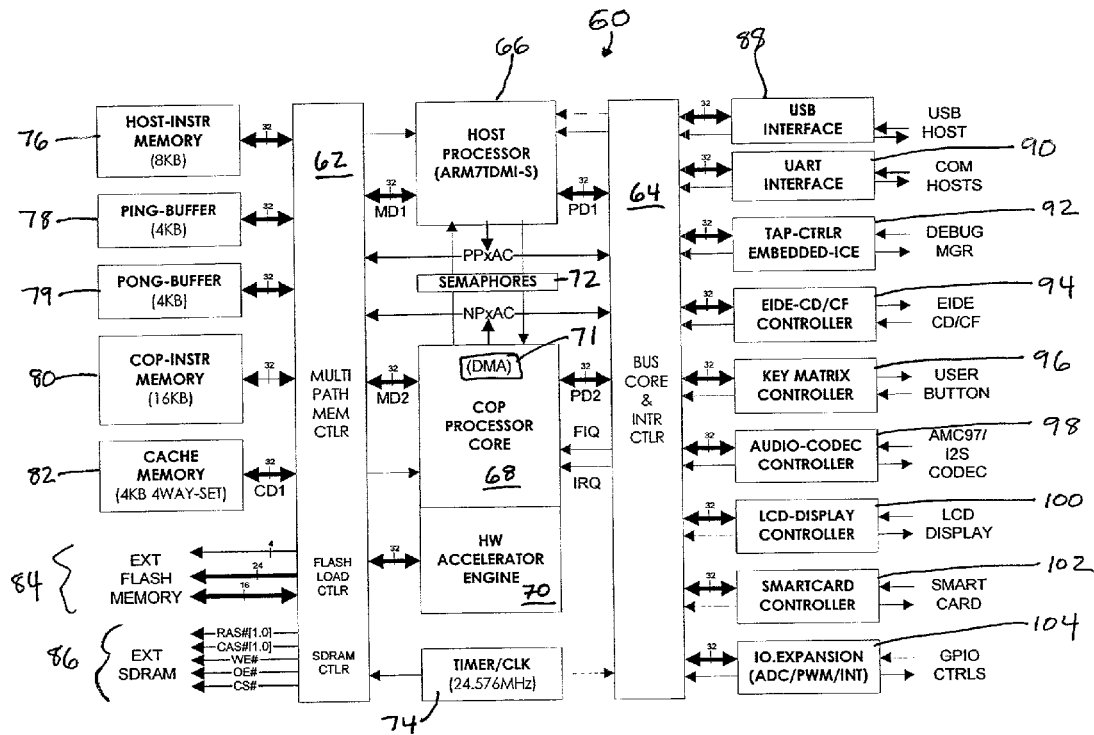
FIG. 1 is a diagram illustrating a preferred embodiment of a portable electronic device, such as a portable digital music system, that may include the power management system in accordance with the invention.

FIG. 1 is a diagram illustrating a preferred embodiment of a portable electronic device 60, such as a portable digital music system, that may include the power management system in accordance with the invention. In this embodiment, the device shown has been implemented as a two processor system of a chip, but the power management system is applicable to any type of electronic device. The system may also include as a cross bar multipath memory controller 62 and a cross bar multipath peripheral controller 64 which are described in more detail in copending patent application Ser. No. 09/847,991 filed on May 2, 2001 and entitled "Cross Bar Multipath Resource Controller System and Method" which is owned by the same assignee as the present invention and which is incorporated herein by reference.

As shown, the multiple processor system 60 may include a host processor 66 which may preferably be a reduced instruction set (RISC) ARM core made by ARM Inc and a coprocessor core 68 that operate in a cooperative manner to complete tasks as described above. In the preferred embodiment, there may also be a hardware accelerator engine 70 as shown. A software DMA engine 71 in this preferred embodiment may be executed by the coprocessor core 68. The software DMA engine is described in more detail in copending patent application Ser. No. 09/847,981 filed on May 2, 2001 and entitled "Software Direct Memory Access Engine for Multiple Processor Systems" which is owned by the same assignee as the present invention and which is incorporated herein by reference.

In more detail, the host processor, the coprocessor and the hardware accelerator engine are all connected to the multipath memory controller 62 and the multipath peripheral controller 64 as shown which permit the host processor and the coprocessor to access each shared resource using its own bus. To control access to the shared resources connected to the multipath memory controller and the multipath peripheral controller, the system 60 may include a semaphore unit 72 which permits the two processors 66, 68 to communicate with each other and control the access to the shared resources. The details of the semaphore unit is described in more detail in copending U.S. patent application Ser. No. 09/847,976 filed on May 2, 2001 titled "Multiprocessor Communications System and Method", owned by the same assignee as the present invention and incorporated herein by reference. The semaphore unit permits the processors to negotiate for the access to the shared resources as described above, but then, due to the multipath controllers 62, 64, permits the processors to access the resources over its own bus that is part of the controllers. To control the timing of the controllers 62, 64, a timer/clock 74 is connected to each controller 62, 64.

Both the memory controller 62 and the peripheral controller 64 are then in turn connected to one or more resources that are shared by the processors. For example, the memory controller 62 in this preferred embodiment is connected to a host instruction memory 76 that is typically accessed by the host processor 66, a ping buffer 78 that may be accessed by each processor as needed, a pong buffer 79 that may be accessed by each processor as needed and a coprocessor instruction memory 80 which is typically accessed by the coprocessor 68. Due to a priority scheme and the cross bar architecture, the host processor may always have priority access to its instruction memory 76 and the coprocessor may always have priority access to its instruction memory 80 since the two processors each have separate buses connected to each resource. The memory controller 62 may also be connected to a cache memory 82, which is a well known 4-way 4 kB set associative cache in the preferred embodiment, a flash memory interface 84 for connecting to an external flash memory and an external synchronous dynamic random access memory (SDRAM) interface 86 with the various necessary signals, such as RAS, CAS, WE, OE and CS, to interface to a typical well known SDRAM.

The peripheral multipath controller, which operates in a similar manner to the memory controller in that each processor may access different shared resources simultaneously, may have one or more peripherals connected to it. In the preferred embodiment, the peripheral controller may be connected to a universal serial bus (USB) interface 88 that in turn connects to a USB device or host, a universal asynchronous receiver/transmitter (UART) interface 90 that in turn connects to communication port (COM) hosts, a TAP/embedded ICE controller 92, an EIDE-CD/CF controller 94 to interface to hard disk drives or CD drives, a key matrix controller 96 that connects to a user input keyboard, an audio-codec controller 98 that connects to an audio coder/decoder (codec), an liquid crystal display (LCD) display controller 100 that connects to a LCD display, a smartcard controller 102 for connecting to a well known smart card and an input/output (I/O) expansion port 104 that connects to one or more different input/output devices. As with the memory controller, the peripheral controller provides access for each processor to each shared resource. Now, the power management system that is incorporated into the above portable electronic system will be described.

Figure 2:
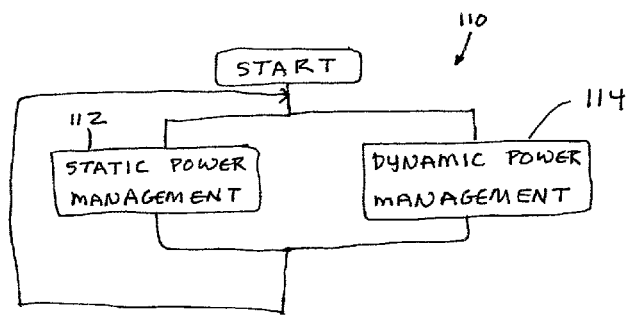
FIG. 2 is a flowchart illustrating the power management method in accordance with the invention.

FIG. 2 is a flowchart illustrating a power management method 110 in accordance with the invention that reduces the total power consumption of the above system. Broadly, the power management method may include the steps of static power management 112 and dynamic power management 114 as shown in FIG. 2 that are performed continuously during the operation of the portable electronic device. More details of the power management states in accordance with the invention are described below with reference to FIG. 6. The power management method shown in FIG. 2 is somewhat simplistic in that both the static and dynamic power management steps incorporate one or more sub-steps which will now be described in more detail.

In general, the goal of power management is to reduce the total power consumption of the portable electronic device. In general, the goal is achieved by only providing power to the devices that need to be in operation at any particular time (e.g., static power management) or by reducing the power consumed by particular devices during particular operations (e.g., dynamic power management). To facilitate this reduction in power consumption, there are a number of desirable options for implementing the reduction. First, there may be dynamic usage which mostly applies to the host processor and coprocessor devices wherein the processor devices should always be placed in a static/halted state when there is "nothing to do". For the host processor, that could involve halting during the RTXC "null task". For the coprocessor, it may be managed by the decoder loop. In a preferred embodiment, each software component in the system may be more-or-less event-driven so that there is no busy-waiting state which wastes power.

On some of the devices within the system, there are logic blocks that do their own "dynamic clocking" to reduce power consumption. For example, the IDE controller 94 uses little or no power until it is accessed. For other device that do not have "dynamic clocking", it may be desirable to provide one or more of the following techniques. First, since each customer will not use all the hardware all of the time, a mechanism for disabling (declocking) hardware that is not used in a particular configuration is desirable and for configuring the firmware to not access it during that time is also desirable. Second, each device that is used intermittently may have an Open/Close driver model wherein when a device is opened, its hardware is powered on and when it is closed the hardware is powered off. Third, some devices have media that is removed or inserted into it or a cable that plugs into it, such as a ZIP drive, a smartcard slot and the like. When there is no media present, the device should be powered down and when the media is inserted, the device is powered up. Fourth, timeouts may be used which are good for devices associated with user input/output (I/O) such as the back-light, the LCD, spinning media, and the system as a whole. Since the timeouts are related to user activity, they have to be configurable as to duration and as to which activities reset them. In general, the goal of the power management system is to cope with wide ranges of performance at a lowest level power consumption by utilizing automated power conservation techniques to achieve "Just Enough Performance for Just Enough Time."

Figure 3:
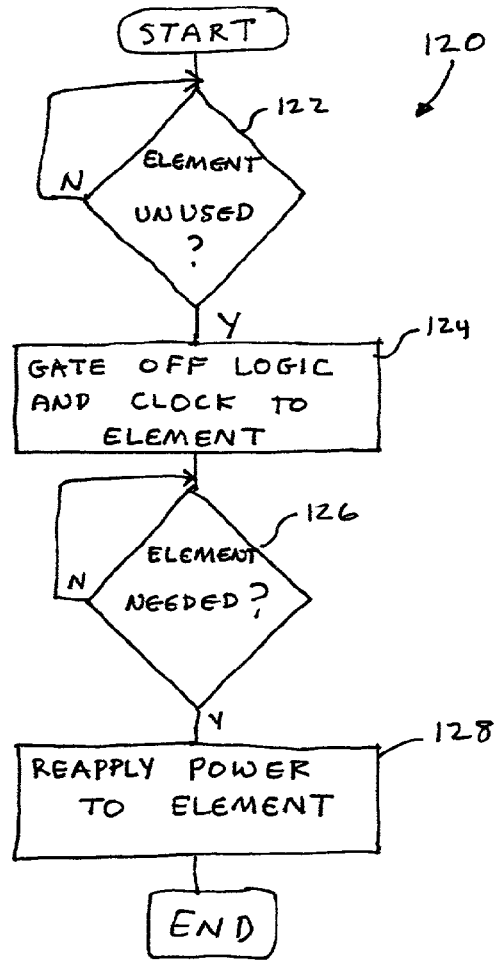
FIG. 3 is a flowchart illustrating more details of the static power management portion of the power management method.

In more detail, the power management system may provide the static controls as well as the dynamic controls. A static power management method 120 in accordance with the invention are shown in FIG. 3. The static power management method begins in that one of the processors may be executing a background task that checks if a device in the system is being used in step 122. If an element is not currently being used, the system may gate off the logic and clock of the device in step 124. The system may then check if the device is needed in step 126 and reactivate the device in step 128 when needed. In this manner, the static power management techniques are used to power down any device that is not being used at the current time. In accordance with a preferred embodiment of the invention, the power may be removed from one or more of the following devices/modules including the 24 MHz crystal (X24M) in the clock generator, the 32 kHz crystal (X32K) in the clock generator, the phase locked loop (PLL) in the clock generator, the RTC, the timer (TMR), a audio codec controller (AMC 97), the SPD interface (SPDIF), the I²S bus, the I²C bus, the universal asynchronous receive/transmit unit (UART), the liquid crystal display device (LCD), the CF, the SMC, the MMC, the MSTK, the general purpose input/output port (GPIO) and interface, the universal serial bus (USB) port and interface, the IDE port and interface, the CCH and either of the processors. The registers associated with the static power management will be described below with reference to FIG. 7.

Figure 4:
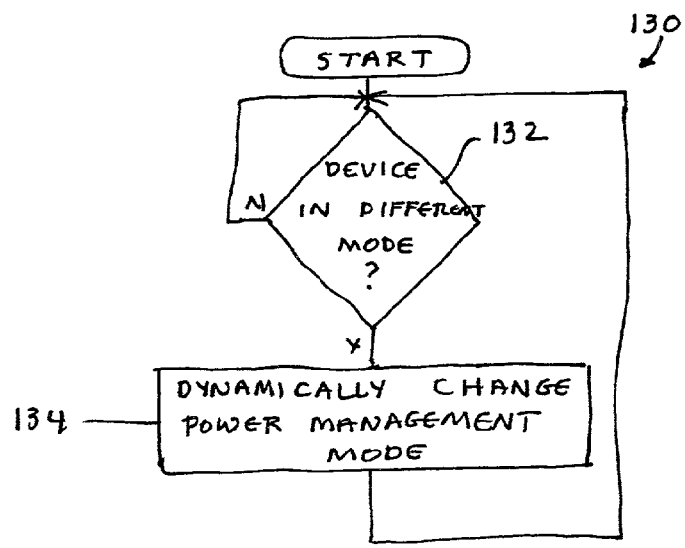
FIG. 4 is a flowchart illustrating more details of the dynamic power management portion of the power management method.

FIG. 4 illustrates a dynamic power management method 130 in accordance with the invention. The dynamic power management may include the system determining if the system is in a different operating mode in step 132 as described below with reference to FIG. 6. If the system has entered into a different mode of operation, then the system may dynamically change the power management mode of the system in step 134. In this manner, the power applied to device within the system may be dynamically changed based on the current operating mode of the system. In a preferred embodiment, dynamic power controls for all "active controllers" (e.g., active Controllers are those devices that are being used for communication, either with external device or the internal CPU) are designed into the chip-select decode logic such that only the selected controller's combinatorial logic would be active for communicating with the main processor. This provides a virtual disconnect of the modules from the high speed internal buses. In a preferred embodiment, interrupt driven algorithms may be used whenever possible instead of polling-mode algorithms both of which are well known.

In more detail, each typical chip may include address inputs, control inputs, data inputs and data outputs with a chip select wherein the chip select is used to typically gate off the control inputs to the chip. To implement the virtual disconnect in accordance with the invention, the chip select signal may also be used to gate off the address inputs, control inputs, data inputs and data outputs so that the chip/device is disconnected from the bus and therefore does not consume power. To implement the virtual disconnect in accordance with the invention, the repeater buffers which are typically present in modern design may be used.

To further enhance the power management capabilities, the system may include asynchronous buffers and scaleable device clock domains for each internal modules to minimize unnecessary logic switching for each peripheral controllers. This provides "Just enough performance" to support individual levels of activity for each individual controllers.

In more detail, each device controller should be optimized for the lowest possible clock operation. For example, when the system is communicating with a serial UART device, the system should be able to slow our clocks to our CPU so that the CPU can talk to other device at it's slower baud rate, instead of running at a fast clock and waiting for the slow device to respond. This becomes much more significant when the processor must wait for user inputs. Therefore, if we drop the CPU clock rate to keep pace with human interaction, we should be able to save some power. On the other extreme, if the CPU has to encode music, it needs to run at top speed to do the complex operations. This full speed operation consumes a lot of power, but this is the power consumed for doing real work.

The system may also include a flexible clock generator, as described in more detail below with reference to FIG. 5, with a programmable PLL with Prescalar and Postscalar to select the appropriate clock frequencies for "Just Enough Processing Performance". The hardware registers associated with controlling the flexible clock generator will be described below with reference to FIG. 7. The system may also include, as part of the dynamic power management, one or more programmable clock states and policies (four in the preferred embodiment) with one or more corresponding programmable clock rate selectors (four in the preferred embodiment) that are provided to automate the dynamic performance boosting for "Just Enough Time" via hardware triggered prioritized interrupt services. The hardware registers associated with the programmable clock states is described below with reference to FIG. 7 and the programmable clock states are described below with reference to FIG. 6. The system also has a symmetric multiprocessor architecture that is provided to balance the work-load between two processors to minimize overall clock frequency and thus the overall power consumption. Now, the flexible clock generator in accordance with the invention will be described.

Figure 5:
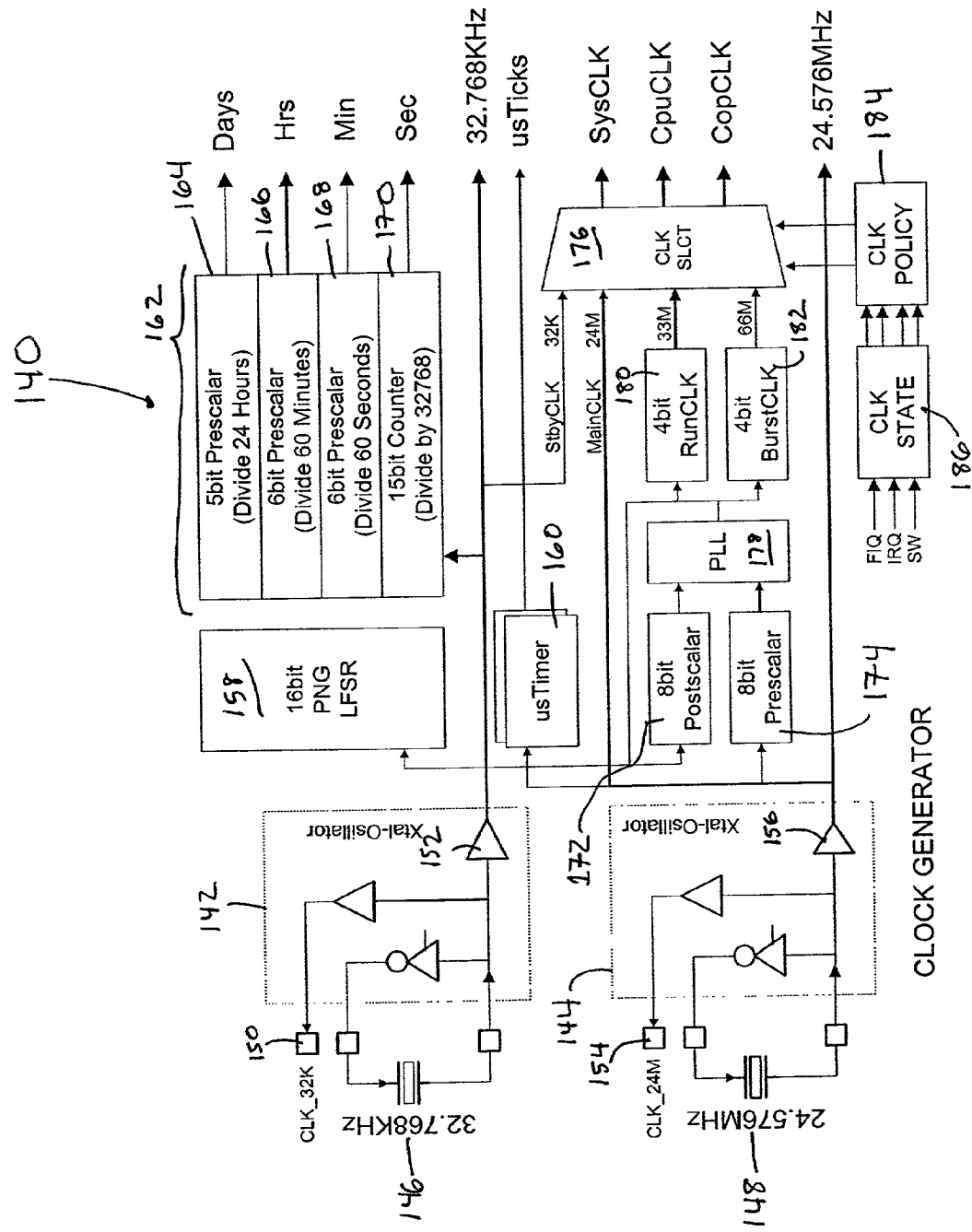
FIG. 5 is a diagram illustrating a preferred embodiment of the flexible clock generator in accordance with the invention that may be used to implement the dynamic power management method in accordance with the invention.

FIG. 5 is a diagram illustrating a preferred embodiment of a flexible clock generator 140 in accordance with the invention that may be used to implement the dynamic power management method in accordance with the invention. To provide a flexible clock signal, the flexible clock generator may include a first crystal oscillator 142 and a second crystal oscillator 144 as shown. The first crystal oscillator may be connected to a 32.768 KHz crystal 146 and may generate a 32 kHz clock signal that is output to an oscillator pin 150 and through a buffer 152. The second oscillator 144 may be connected to a 24.576 MHz crystal 148 and may generate a 24 MHz clock signal that is output to an oscillator pin 154 and through a buffer 156. Thus, a 32 KHz clock signal and a 24 MHz clock signal are generated.

The flexible clock generator 140 may also include a 16 bit PING LFSR 158 which is a random number generator (a preferred random number generator is described in co-pending patent application Ser. No. 09/847,982 filed May 2, 2001 and titled "Random Number Generation Method and System" which is incorporated herein by reference), a us Timer 160 that generates as usTicks signal (this is a microsecond time pulse generator for various timing control) and a real-time clock and calendar (RTC) element 162. The real-time clock and calendar element may receive the 32 KHz clock signal as an input that is fed into a 5-bit prescalar 164, a 6 bit prescalar 166, a 6 bit prescalar 168 and a 15 bit prescalar 170 that are used to generate the real-time time and date for the system. In particular, one prescalar generates a day (Days) output, one prescalar generates a hours (Hrs) output, one generates a minutes (Min) output and one generates a seconds (Sec) output as is well known.

The flexible clock generator 140 may further include an 8 bit postscalar 172, an 8 bit prescalar 174 and a clock select multiplexer 176. The outputs from the postscalar and prescalar 172, 174 are input into a well known phase locked loop (PLL) 178. The output from the PLL is fed into a 4 bit RunCLK unit 180 and a 4 bit BurstCLK unit 182 wherein the RunCLK unit generates a 33 MHz clock signal (33M) and the BurstCLK unit generates a 66 MHZ clock signal (66M). The 33 MHz clock signal (33M), the 66 MHz clock signal (66M), the 24 MHz clock signal (24M or MainCLK) and the 32 kHz clock signal (32K or StbyCLK) are all fed into the clock select multiplexer (CLK SLCT) 176 that selects one of the clock signals to output. Thus, as shown, the clock select multiplexer may output one or more different frequency clock signals including a 32 kHz signal, a 24 MHz signal, a SysCLK signal, a CpuCLK signal and a CopCLK signal.

To control which clock signal is output at a particular time, there may be a clock policy unit (CLK POLICY) 184 that provides signal to the multiplexer to select a particular clock signal. The clock policy unit is in turn driven by a clock state unit (CLK STATE) 186 that may be a state machine. The clock state unit may be driven by various interrupt signals such as an FIQ signal, an IRQ signal and software commands (SW) as shown. In operation, the interrupt signals or software commands may indicate a new operational state of the system and the state machine may transition to the new state which points to a particular location in a hardware register as described below. The state machine may then generate the appropriate signals based on the hardware register location(s) so that the clock policy unit may generate the appropriate multiplexer control signals. For example, the system may enter an idle state and the state machine may transition to the IDLE state. The hardware register corresponding to the IDLE state may indicate that the 32 KHz clock signal for certain devices in the system and the 24 MHz signal for other devices should be output and the clock policy unit may generate the appropriate control signals to the multiplexer.

In more detail, the variable rate clocks are utilized by the frequency multiplier PLL and the Burst/Run/Cruse/Standby clock arbitration selector 176. The fixed rate 24 MHz clock signal is used for a baud rate counter and timing sequence applications, while the 32 KHz clock is used to generate Real Time Clock and Calendar (RTC) during normal operations as described above. The programmable rate SysCLK shall be used to enable synchronous operation of the system resources. The CpuCLK and CopCLK shall be used for the primary and the secondary processor core operations. When dynamic rate shifting is enabled, these clocks (SysCLK, CpuCLK and CopCLK) shall be automatically and independently shifted to a higher frequency when a Fast Interrupt Request (FIQ) is activated. For example, while the processor is running at StandBy mode (32 KHz), the FIQ could activate the 24 MHz burst mode. As another example, while the processor is running at a Normal mode clock frequency (~40 MHz), the activation of the FIQ could switch-on the Burst Clock frequency (~80 MHz). Consequently, the hardware provided the shortest time to wakeup with bursting clocks, the Firmware (IRQ/FIQ Service Routine) provided the shortest time to sleeping at suspended clocks for the maximum power savings. By default, all clocks may run at the top clock frequency during a Power-On Cold Reset. When the CpuCLK and CopCLK are in a Stop Clock Mode, activation of IRQ may switch-on the clock frequency for the 32 KHz clock. Now, the programmable power management states in accordance with the invention will be described in more detail.

FIG. 6 is a flowchart illustrating the dynamically programmable power management states 200 in accordance with the invention. As shown, there may be a BUSY state 202, an IDLE state 204, a DEAD state 206 and a SLEEP state 208 and the power management state can transition between the states as shown. The different power management states may be thought of as power management "macros" for balancing system responsiveness and power usage. The states focus on management of the host processor and the coprocessor. For each system state, other devices are still expected to be power managed on an individual/independent basis as set forth below. In more detail, individual devices interrupt the Supervisor for a certain requests where the Supervisor assigns appropriate tasks to satisfy the request in a timely manner. Consequently, the Supervisory service routine determines the nature of the service required and schedules the resource and task required. Now, an example of the possible states, the set-ups for the states and the transitions to other states in a preferred embodiment will be described.

Busy State

In this state, the system is performing a performance-intensive task. In the preferred digital music device, those performance-intensive tasks may include digital music playback, music recording, music download, music upload, music data transfer, firmware updates, etc.

Setup: The processor's cores are clocked off the PLL at high speeds (60–70 MHz or whatever is determined to be adequate), the IRQs and FIQs are run at same rate, other devices are powered as needed and idle tasks just halt the host processor and the coprocessor.

Busy To Idle Transition: Since the system has a firmware "supervisor" who can potentially know when intensive tasks are in progress, we can have the supervisor manage transitions into and out of the Busy state based on what commands come in from the user or from other communications. Whenever an intensive task finishes, the supervisor switches the system back to the Idle state.

Idle State

In this state, the system is either waiting for the user to do something "significant" (e.g., strike a key or the like) or is connected to an active communications link and is waiting for a command (download, upload, etc.) or is waiting to time out. There are at least two potential "sub-modes". In one sub-mode, if the user it not around, the display can time out, but the processor needs to stay up so we can communicate. In a second sub-mode, if the user is around, then essentially only the screen and keypad/touch support needs to be kept running which is a "lights are on but no one is home" mode.

Setup: In the mode, the coprocessor is off, the PLL is off and the host processor is clocked at 32 KHz. In addition, the IRQs and FIQs are run at 24 MHz, the auto bit is set so that the clock jumps to 24 MHz on an IRQ or FIQ signal and other devices are powered as needed.

Idle to Busy Transition: When the supervisor starts an intensive task as described above, it transitions the system to the Busy state.

Idle to Sleep Transition: If there is no activity, either by the user or from the communication ports, for a period of time, the system bookmarks its current activity to flash memory (stores its data) and goes to the Sleep state. The bookmark, for example, may contain information like: "paused playing Moonlight Sonata at 2:34:104 from file "Moonlight" on CF card serial number 1029384756".

Idle to IRQ/FIQ Transitions: When an IRQ or FIQ interrupt signal occurs, the host processor may switch to a 24 MHz clock. The CPU may remain at 24 MHz until it drops into the RTXC null task and then the clock is cycled back down to 32 KHz. This may allow screen updates and so forth to run quickly enough.

Sleep (Hibernate) State

In this state, the user has turned the system "off" or the system has timed out because of user and communications inactivity or batteries have been drained. In this mode, general purpose devices have to keep the RAM active (to avoid losing data) when they sleep, or they have a "hibernate" mode where they save the RAM contents to a hard disk or whatever. In accordance with the invention, a Hibernate mode may be implemented by bookmarking (see description above) what we were doing to flash and power everything off except the RTC and any wakeup circuits.

Setup: In this mode, everything is turned off except the RTC and active wakeup circuits, if any.

Sleep to Idle Transition: In response to an "on" command, the system transitions into the Idle state, gets the bookmark from flash, and then decides whether it needs to go to Busy state or not. It is also possible to transition directly into the Busy state and then drop into the Idle state. However, there is a greater risk of killing off almost-dead batteries before you have a chance to measure them.

Dead State

In this mode, the power has failed. The bookmarked system state should still be safely stored in flash, but the time and date will need to be set upon restart.

Dead to Idle Transition: The transition is the same as the Sleep to Idle transition, except that the time and date will need to be set and they may not be a bookmarked system state in flash (if this was the first time the unit was powered up). In the alternative, there may be a default bookmark that will be placed in flash during manufacturing.

Global Transitions

Busy or Idle to Sleep Transition: On an "off" command or if the system runs out of power from the battery, the system may go into the Sleep state. Since there are some complication that result when the user tries to put the system into a sleep mode while it is busy writing flash, communicating or whatever, the system may prompt the user to wait for some period of time or cancel some pending operation before sleeping. The system may also ensure that the system operations are complete before shutting the screen off so that the user does not inadvertently swap batteries or some other action, which could damage the system. Now, an example of the power management registers in accordance with a preferred embodiment of the invention will be described.

FIG. 7 is a diagram illustrating an example of the power management registers 220 in a preferred embodiment of the invention. For static power management, the clock enable registers 222, 224 are shown (Clock Enable Registers $CF00:5000 and $CF00:5004). The different clock registers to select a particular clock frequency from the flexible clock generator are registers 226, 228 ($CF00:5018 and $CF00:501C). In addition, the preferred system includes the four programmable clock policies with four programmable clock rate selectors are provided to automate the dynamic performance boosting for "Just Enough Time" via hardware triggered prioritized interrupt services. This provides an automated performance scaling to maintain real-time responses and deterministic latencies while "Running" or "Idling" at a lowest clock rate for the maximum power conservation. The registers 230, 232, 234 that control these clocks are shown. ($CF00:5008, $CF00:500C, $CF00:5010).

Some experimental results associated with the above described power management system and method are now provided. In particular, listed below are two experimental power consumption measurement to be used as our Playback performance Goal. To perform the test, the test program was written to enable Cache then Idle Loop on IRAM. From the Multi-ICE debugger, various modules were then disabled as indicated while observing the power consumption. First, the power consumption of a single processor at 49 MHz was determined. The results for the single processor are:

a. 104mA at 2.5V core, Cache=ON, all Dev.CLKs=OFF, all Dev.RSTs=OFF, JTAG=ON. (260mW)

b. 103mA at 2.5V core, Cache=ON, all Dev.CLKs=OFF, all Dev.RSTs=ON, JTAG=ON. (258mW)

c. 76mA at 2.5V core, Cache=OFF, all Dev.CLKs=OFF, all Dev.RSTs=ON, JTAG=ON. (190mW)

d. 82mA at 2.5V core, Cache=ON, all Dev.CLKs=OFF, all Dev.RSTs=ON, JTAG=OFF. (205mW)

>>   27mA for Cache Controller (67mW)

>>   21mA for JTAG Debug Controller (52mW)

>>>> 55mA for CPU-IRAM (137mW)

The results for dual processor that are each running at 24.578 MHz are:

a. 68mA at 2.5V core, Cache=ON, Dev.CLKsr=MMC-Play, JTAG=ON (170mW)
b. 54mA at 2.5V core, Cache=OFF, Dev.CLKs=MMC-Play, JTAG=ON. (135mW)
c. 58mA at 2.5V core, Cache=ON, all Dev.CLKs=MMC-Play, JTAG=OFF. (145mW)
   >>    14mA for Cache Controller (35mW)
   >>    16mA for JTAG Debug Controller (40mW)
   >>>>  38mA for CPU-IRAM-MMC-AC97 (95mW)

From the above experimental results, it was determined that, for the same amount of performance (49 million instructions per second (MIPS)), the use of single processor running at 49 MHz consumes more power than utilizing two processors at half the clock speed (24 MHz). this results is due to the clock distribution circuit for the support logics (IRAM, BUSES, CACHES, etc.) having to idle at a higher clock rate. In more detail, although the processor provides the same amount of work and thus the same power consumption (22 mW at 49 MHz versus 21 mW at 24 MHz), the clock distribution losses from the synchronous Flops are significant.

The experimental results also indicated that the JTAG Debug Controller should be turned off for the production units because it utilizes considerable power when not disabled. The experimental results also indicated that, if at all possible, do not activate the control logics when the module is not the target for the bus cycle. It appears that the system may be able to save some more power if we "pre-determine" our target address (one of four IRAM blocks,Cacheable Cycles, Memory Cycles, and Peripheral Cycles) and activate the Address/Data/Control/Clock to the target devices only.

The experimental results also indicated that when the external IO interface is not being used, the outputs may be driven to the inactive state of the line according to its pull-up or pull-down configurations. If the output is tristateable, tri-state the un-used pins. If the bidirectional pin is not used, drive the pin to it's pulled-up or pulled-down state before tristating the output. Now, the results of the system operation with only the static power management and without any power management is shown.

| | Power Use With Static Power Controls | | | |
|---|---|---|---|---|
| | TOTAL | CORE | I/O DEVICES | AUDIO AMP |
| SLEEP (32 KHz) | (16 mA 1.5 V) 0.024 W DCIN | (1 mA 2.5 V)** 3 mW | (5 mA, 3.3 V)** 16 mW | (1 mA, 5 V)** 5mW |
| IDLE (24 MHz) | (148 mA 1.5 V) 0.222 W DCIN 19.3% | (32 mA, 2.5 V) 80 mW 11.6% | (34 mA, 3.3 V) 112 mW 47.9% | (6 mA, 5 V)* 30 mW 13.0% |
| PLAY (49 MHz) | (558 mA 1.5 V) 0.837 W DCIN 70.1% | (161 mA, 2.5 V) 403 mW 56.2% | (62 mA, 3.3 V) 205 mW 82.0% | (46 mA, 5 V) 230 mW 100% |
| REC (66 MHz) | (664 mA 1.5 V) 0.996 W DCIN 74.9% | (222 mA, 2.5 V) 555 mW 76.8% | (64 mA, 3.3 V) 211 mW 56.1% | (46 mA, 5 V) 230 mW 100% |

Without the power management controls, the power consumption levels are:

| | TOTAL | CORE | I/O DEVICES | AUDIO AMP |
|---|---|---|---|---|
| Power On | (726 mA 1.5 V) 1.089 W DCIN | (275 mA 2.5 V)** 687 mW | (52 mA, 3.3 V)** 172 mW | (46 mA, 5 V)** 230 mW |
| IDLE (66 MHz) | (768 mA 1.5 V) 1.151 W DCIN | (275 mA 2.5 V)** 687 mW | (71 mA, 3.3 V) 234 mW | (46 mA, 5 V)* 230 mW |
| PLAY (66 MHz) | (795 mA 1.5 V) 1.193 W DCIN | (285 mA, 2.5 V) 713 mW | (76 mA, 3.3 V) 250 mW | (46 mA, 5 V) 230 mW |
| REC (66 MHz) | (886 mA 1.5 V) 1.329 W DCIN | (289 mA, 2.5 V) 723 mW | (114 mA, 3.3 V) 376 mW | (46 mA, 5 V) 230 mW |

In a preferred embodiment, the features of the system may include:
1. Record and Playback using ROM, SRAM, MMC, Static LCD with 1 second refresh or blinking Icon.
2. Record from Line-In (CD) at 32KSS with 64 kbps, 128 kbps, or 256 kbps compression rate.
3. Record from Line-In (FM) at 22KSS with 32 kbps, 64 kbps, or 128 kbps compression rate.
4. Record from Mic-In (Voice) at 8KSS with 32 kbps, or 64 kbps compression rate.

The power control settings below (as shown in a Reference Board) are described. The SLEEP mode is when unit is "OFF" while power is still supplied. The IDLE mode is when the unit is in Standby or in the process of accepting user commands. The PLAY mode is when the unit is decoding and playing back MP3 file. The REC mode is when the unit is encoding MP3 and recording to a file. The Control Setting could be done in the order specified, but standard programming precaution should be utilized to avoid system hang-up. Please refer to GPIO assignment below for the associated power control bits.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A policy-based dynamic power management system for a computer system, the computer system including a plurality of devices, wherein the power management system comprises:
   (a) a clock generator circuit including at least one fixed rate clock signal oscillator, said generator circuit for generating a plurality of clock signals;
   (b) a clock selector circuit for providing a selected one or more of the plurality of clock signals to each of said plurality of devices; and
   (c) a clock policy unit for monitoring operational state of the computer system and for selecting the one or more clock signals based on factors including a current state of operation of the computer system and one or more

| | |
|---|---|
| SLEEP: | Wait for WakeUp Events @ 32Khz SysClock (Buttons or Card Detects) |
| | AudioAmp=OFF, AC97=PD, Display=OFF, BackLight=OFF |
| | $CF00:5000 = 0008h (ClockOn = RTC, ClockOff= all others) |
| | $CF00:5004 = 0001h (ClockOn = GPIO, ClockOff = all others) |
| | $CF00:5008 = 0001h (Static CPU clock setting at IDLE Clock rate) |
| | $CF00:500C = 0000h (Set Clock Policy as 32K/32K/32K/32K settings) |
| | $CF00:5010 = 2000h (TurnOff=PLL, 24M. TurnOn=32K) |
| | $CF00:501C = 000Ch (Postscale = 12x) PLLCLK = 49MHz (off) |
| | $CF00:5018 = 0006h (Prescale = 1/6) RefCLK = 4MHz (off) |
| | $CF00:4000 = 2044h (ROM access time with 7Ons Flash) |
| | $CF00:4008 = 2022h (RAM access time with 12ns SRAM) |
| IDLE: | Wait for Control Events @ 32KHz SysClock (Buttons, Card, or Comm Detects) |
| | AudioAmp=OFF, AC97=PD, Display=ON, BackLight=OFF |
| | $CF00:5000 = 0018h (ClockOn = TMR and RTC, ClockOff = all others) |
| | $CF00:5004 = 0031h (ClockOn = CCH and GPIO, ClockOff = all others) |
| | $CF00:5008 = 0081h (Dynamic CPU clock setting at IDLE Clock rate) |
| | $CF00:500C = 0054h (Set Clock Policy as 24M/24M/24M/32K settings) |
| | $CF00:5010 = 6000h (TurnOff=PLL. TurnOn=24M,32K) |
| | $CF00:501C = 000Ch (Postscale = 12x) PLLCLK = 49MHz (off) |
| | $CF00:5018 = 0006h (Prescale = 1/6) RefCLK = 4Mhz (on) |
| | $CF00:4000 = 2044h (ROM access time with 7Ons Flash) |
| | $CF00:4008 = 2022h (RAM access time with 12ns SRAM) |
| PLAY: | Play from MMC @ 49MHz SysClock? (We need to optimize it later) |
| | AudioAmp=ON, AC97=ON, Display=StaticON (blink Icon), BackLight=OFF |
| | $CF00:5000 = 403Ah (ClockOn = MMC, AC97, TMR, RTC, C.24M. ClockOff = all else) |
| | $CF00:5004 = 0031h (Clock_Off = IDE, USB) |
| | $CF00:5008 = 0084h (Dynamic CPU clock setting at MAIN Clock rate) |
| | $CF00:500C = 00E4h (Set Clock Policy as PLL/PLL/24M/32K settings) |
| | $CF00:5010 = E000h (TurnOn=PLL, 24M,32K. Set BurstClk = RunClk = PLLCLK) |
| | $CF00:501C = 000Ch (Postscale = 12x) PLLCLK = 49MHz (on) |
| | $CF00:5018 = 0006h (Prescale = 1/6) RefCLK = 4MHz (on) |
| | $CF00:4000 = 2044h (ROM access time with 7Ons Flash) |
| | $CF00:4008 = 2022h (RAM access time with 12ns SRAM) |
| REC: | Record to MMC @ 66Mhz SysClock |
| | AudioAmp=ON, AC97=ON, Display=StaticON (blink Icon), BackLight=OFF |
| | $CF00:5000 = 403Ch (Clock_Off= Mstk, SMC, LCDC, UART, I2C, I2S, SPDIF, C.EXT, C.32K) |
| | $CF00:5004 = 0031h (Clock_Off = IDE, USB) |
| | $CF00:5008 = 0008h (Static CPU clock rate using Burst Clock policy) |
| | $CF00:500C = 00E4h (Set Clock Policy as PLL/PLL/24M/32K settings) |
| | $CF00:5010 = E000h (TurnOn=PLL, 24M,32K. Set BurstClk = RunClk = PLLCLK) |
| | $CF00:501C = 0010h (Postscale = 16x) SysCLK = 66MHz (on) |
| | $CF00:5018 = 0006h (Prescale = 1/6) RefCLK = 4MHz (on) |
| | $CF00:4000 = 2044h (ROM access time with 7Ons Flash) |
| | $CF00:4008 = 2022h (RAM access time with 12ns SRAM) | programmable policies, wherein the policies indicate desired clock frequencies associated with the current state of operation.

2. The system of claim 1 further comprising a static power management system for managing power application to each of said plurality of devices by withdrawing power from a device that is not currently active, and applying power to the device when the device is needed to be active.

3. The system of claim 2, wherein the static power management system includes a circuit for disconnecting certain pins of one or more of the plurality of devices.

4. The system of claim 1, wherein the clock generator circuit includes a first oscillator that generates a first clock signal, a second clock oscillator that generates a second clock signal, and a programmable clock circuit that generates a third clock signal based on the second clock signal, wherein said clock selector circuit selects one of the first, second and third clock signals to provide a portion of the computer system with a desired clock signal.

5. The system of claim 4, wherein the clock selector circuit includes a state machine for monitoring the current operational state and selecting the one or more clock signals.

6. The system of claim 5, wherein the current operational state is selected from a group of states including an idle state when the computer system is waiting for an input, a busy state when the computer system is performing a task, a sleep state when the computer system has timed out due to inactivity and a dead state when power has failed to the computer system.

7. The system of claim 6, wherein the clock generator circuit includes a circuit that generates first and second system clocks, wherein each of the clocks is independently and simultaneously operable.

8. The system of claim 7, wherein the programmable clock circuit includes a phase locked loop, the computer system includes first and second processors and, during the idle state, the clock selector circuit:
disconnects clocks from the phase locked loop and the second processor;
and connects the first processor to the fist system clock.

9. The system of claim 7, wherein, during the busy state, the clock selector circuit connects clocks to the phase locked loop and the second processor and connects the first processor to the second system clock.

10. The system of claim 6, wherein, during the sleep state, the clock selector circuit disconnects clocks from the first and second processors.

11. The system of claim 5, wherein the clock state machine is controlled by an interrupt signal and software commands.

12. The system of claim 4, wherein the programmable clock circuit generates a fourth clock signal.

13. The system of claim 12, wherein the first, second, third and fourth clock signals have different frequencies.

14. The system of claim 13, wherein the first clock signal frequency is 32 kHz, the second clock signal frequency is 24 MHz, the third clock signal frequency is 33 MHz and the fourth clock signal frequency is 66 MHz.

15. The system of claim 4 further comprising a time of day circuit that generates time of day clock signals based on the first clock signal.

16. The system of claim 4, wherein the clock select circuit includes means for dynamically changing the clock frequency applied to each device of the computer system based on the task being performed by the computer system.

17. The system of claim 4, wherein the clock select circuit includes a multiplexer.

18. The system of claim 4, wherein the programmable clock generator further includes a prescalar unit and a post scalar unit whose outputs are fed into a phase locked loop that generates a third clock signal and a fourth clock signal having different frequencies.

19. A policy-based dynamic power management method for a computer system having a plurality of devices wherein the power management method comprises:
(a) generating a plurality of clock signals wherein each of the plurality of clock signals has a different predetermined frequency; and
(b) supplying one or more of the plurality of clock signals to each of the plurality of devices, wherein the one or more clock signals are selected based on control signals received from a clock policy unit;
(c) adjusting the frequency of the one or more clock signals responsive to changes in the control signals, wherein the clock policy unit configures the control signals based on factors including a current state of operation of the computer system and one or more programmable policies, wherein the policies indicate desired clock frequencies associated with the current state of operation.

20. The method of claim 19 further comprising withdrawing power from certain devices to reduce power consumption of the computer system.

21. The method of claim 20, wherein said withdrawing power includes disconnecting address, control and data in and data out pins of one or more of the plurality of devices.

22. The method of claim 19, wherein said generating further includes generating a first clock signal with a first oscillator, generating a second clock signal using a second oscillator, generating a third clock signal based on the second clock signals, and selecting by a programmable clock select circuit one of the first, second and third clock signals to supply a portion of the computer system.

23. The method, of claim 22, wherein said selecting further includes determining by a state machine the clock state of the computer system at a predetermined time and generating control signals to the clock select circuit in order to select a corresponding clock signal.

24. The method of claim 23, wherein said selecting further includes an idle state wherein the computer system is waiting for an input, a busy state wherein the computer system is performing a task, a sleep state wherein the computer system has timed out due to inactivity and a dead state wherein power has failed to the computer system.

25. The method of claim 24, wherein said selecting further includes generating a system clock, generating a processor clock and generating a co-processor. clock wherein each of the clocks is independently and simultaneously operable.

26. The method of claim 24, wherein during the idle state, no clock signal is provided to the phase locked loop and co-processor so that they are off, and generating the first clock signal for the processor so that the processor is clocked at a slow rate and generating a high rate clock for an interrupt circuit so that the interrupt circuit is active and can increase the clock frequency for the computer system.

27. The method of claim 24, wherein during the busy state, a high rate clock signal is applied to the processor, the co-processor and the interrupt circuits.

28. The method of claim 24, wherein during the sleep state, no clock signal is applied to the processor and the co-processor.

29. The method of claim 23, wherein the clock state machine is controlled by an interrupt signal and software commands.

30. The method of claim 22 further comprising generating a fourth clock signal.

31. The method of claim 30, wherein the first, second, third and fourth clock signals have different frequencies.

32. The method of claim 31, wherein the first clock signal frequency is 32 kHz, the second clock signal frequency is 24 MHz, the third clock signal frequency is 33 MHz and the fourth clock signal frequency is 66 MHz.

33. The method of claim 22 further comprising generating time of day clock signals based on the first clock signal.

34. The method of claim 22, wherein the clock select circuit further includes means for dynamically changing the clock frequency applied to each device of the computer system based on the task being performed by the computer system.

35. The method of claim 22, wherein the clock select circuit includes a multiplexer.

36. The method of claim 22, wherein the programmable clock circuit further includes a prescalar unit and a post scalar unit having outputs that are fed into a phase locked loop that generates a third clock signal and a fourth clock signal having different frequencies.

37. A flexible clock generator, comprising:
a first oscillator that generates a first clock signal;
a second clock oscillator that generates a second clock signal;
a programmable clock circuit that generates a third clock signal based on the second clock signal wherein a frequency of said third clock signal can be in a range from less than to greater than a frequency of said second clock signal; and
a clock select circuit that selects one of the first, second and third clock signals that is supplied to a portion of the computer system to provide that portion of the computer system with a predetermined clock signal, wherein the clock select circuit selects clock signals based on factors including a current state of operation of the computer system and one or more programmable policies, wherein the policies indicate desired clock frequencies associated with the current state of operation.

38. The generator of claim 37, wherein the clock select circuit includes a clock state machine for determining the clock state of the computer system at a predetermined time and a clock policy circuit for generating control signals to the clock select circuit in order to output the appropriate clock signal.

39. The generator of claim 38, wherein the clock state machine provides an idle state wherein the computer system is waiting for an input, a busy state wherein the computer system is performing a task, a sleep state wherein the computer system has timed out due to inactivity and a dead state wherein power has failed to the computer system.

40. The generator of claim 39, wherein the clock select circuit further includes a circuit that generates a system clock, a circuit that generates a processor clock and a circuit that generates a co-processor clock wherein each of the clocks is independently and simultaneously operable.

41. The generator of claim 39, wherein, during the idle state, the clock select circuit disconnects clocks from the phase locked loop and co-processor, the clock select circuit generates the first clock signal for the processor so that the processor is clocked at a slow rate and the clock select circuit generates a high rate clock for an interrupt circuit so that the interrupt circuit is active and can increase the clock frequency for the computer system.

42. The generator of claim 39, wherein, during the busy state, the clock select circuit generates a high rate clock signal for the processor, the co-processor and the interrupt circuits.

43. The generator of claim 39, wherein, during the sleep state, the clock select circuit generates no clock signal for the processor and the co-processor.

44. The generator of claim 38, wherein the clock state machine is controlled by an interrupt signal and software commands.

45. The generator of claim 37, wherein the programmable clock circuit generates a fourth clock signal.

46. The generator of claim 45, wherein the first, second, third and fourth clock signals have different frequencies.

47. The generator of claim 46, wherein a frequency of the first clock signal is 32 kHz, a frequency of the second clock signal is 24 MHz, a frequency of the third clock signal is 33 MHz and a frequency of the fourth clock signal is 66 MHz.

48. The generator of claim 37 further comprising a time of day circuit that generates time of day clock signals based on the first clock signal.

49. The generator of claim 37, wherein the clock select circuit includes means for dynamically changing the clock frequency applied to each component of the computer system based on a task being performed by the computer system.

50. The generator of claim 37, wherein the clock select circuit includes a multiplexer.

51. The generator of claim 37, wherein the programmable clock generator includes a prescalar unit and a post scalar unit whose outputs are fed into a phase locked loop that generates a third clock signal and a fourth clock signal having different frequencies.

52. A power management method for a computer system comprising:
dynamically managing power application to each of a plurality of devices of said computer system including
a) first sensing a current operational usage of said each device;
b) adjusting a frequency of a clock signal from a clock generator to said each device, said frequency in proportion to said usage, wherein said clock signal is supplied by a flexible clock generator including at least one oscillator, and wherein said generator provides at least one signal having a frequency adjustable from less than to greater than a frequency of said at least one oscillator; and
c) responsive to interrupt and software command, modifying current operational usage of one or more of said each device.

53. The method of claim 52, further comprising:
statically managing power application to said each device including
a) second sensing to determine if a system device is being used;
b) withdrawing power including a clock signal from a device, if said device is not being used;
c) determining if an unpowered device is needed; and
d) applying power including a clock signal to said unpowered device if said device is needed.

54. The method of claim 53 further comprising:
optimizing by a device controller to manage said dynamic power application to said each device for a lowest computer system power consumption consistent with required operation of said each device.

55. The method of claim 53 wherein said withdrawing power includes gating off logic and a clock signal to a device, and applying power includes reapplying logic and a clock signal to said device.

* * * * *